(12) United States Patent
Hiramoto et al.

(10) Patent No.: US 6,748,984 B2
(45) Date of Patent: Jun. 15, 2004

(54) SUPPLY APPARATUS FOR SPOUTS OR BAGS WITH SPOUTS

(75) Inventors: Shinichi Hiramoto, Iwakuni (JP); Kakue Nakamoto, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 0 days.

(21) Appl. No.: 10/387,903

(22) Filed: Mar. 13, 2003

(65) Prior Publication Data
US 2003/0172990 A1 Sep. 18, 2003

(30) Foreign Application Priority Data
Mar. 16, 2002 (JP) .......................... 2002-118548

(51) Int. Cl.⁷ .............. B65B 43/42; B67C 3/00
(52) U.S. Cl. ............. 141/166; 141/144; 141/171; 141/314; 198/377.1
(58) Field of Search ............ 141/129, 144, 141/165, 166, 168, 171, 313, 314; 198/373, 377.1, 377.01, 377.03

(56) References Cited
FOREIGN PATENT DOCUMENTS

| DE | 199 38 879 | 3/2001 |
|---|---|---|
| JP | 11-208884 | 8/1999 |
| JP | 2001-353793 | 12/2001 |

Primary Examiner—Timothy L. Maust
(74) Attorney, Agent, or Firm—Koda & Androlia

(57) ABSTRACT

An apparatus for supplying spouts (or bags attached with spouts) to spout holding members provided on the edge of a circular rotor, including a pair of guide rails that engage with the groove portions of spouts, a timing screw that conveys spouts along the guide rails, and a pushing pawl that pushes out at a high speed a leading spout among the spouts, which are being conveyed along the guide rails, from the guide rails into the holding section of each spout holding member. The pushing pawl is disposed beneath the guide rails, and it is retracted so as not to interfere with the leading spout and then rotated inward so as to be behind the leading spout, advances and overtakes the leading spout, and then contacts the leading spout from behind, thus pushing the spout out in the forward direction and to the spout holding member.

9 Claims, 7 Drawing Sheets

SUPPLY APPARATUS FOR SPOUTS OR BAGS WITH SPOUTS

BACKGROUND OF THE INVENTION

1. Field of the Invention

The present invention relates to an apparatus for supplying spouts or bags attached with spouts, which are conveyed in a single row along guide rails, to a rotating rotor of, for instance, an manufacturing apparatus of spout-attached bags, a filling machine, etc.

2. Prior Art

In regard to transfer of spouts, Japanese Patent Application Laid-Open (Kokai) No. 11-208884 discloses a spout supply apparatus.

In this supply apparatus, spouts are conveyed in a single row along a pair of guide rails that engage with groove portions formed between flanges formed on the outer circumferential surfaces of spouts, and then the spouts are supplied to a rotor that makes a continuous rotation. In other words, the spouts are arranged and conveyed by a timing screw so that the spouts are separated from each other by a predetermined distance; and when the spouts are pushed out from the tip end of the timing screw, the spouts leave the guide rails and are held by a spout holding means provided on the rotor which has just rotated to this spout-push-out point, thus completing the transfer of the spouts from the guide rails to the rotor.

The above continuously rotating rotor further transfers the spouts to a continuously rotating rotor of, for instance, an apparatus that manufactures bags attached with spouts.

Meanwhile, in a supply apparatus disclosed in Japanese Patent Application Laid-Open (Kokai) No. 2001-353793, spouts that are conveyed in a single row along a pair of guide rails that engage with the groove portions of the spouts are supplied to an intermittently (stop, acceleration, constant speed, deceleration, stop) rotating rotor.

The guide rails of this supply apparatus are disposed in a direction that is tangential to the circular rotor, and the head portion of the leading spout (among the conveyed spouts) that has come to the tip end portions of the guide rails is held by holding members disposed on the circumference of the rotor when this rotor is stopped, thus completing the transfer of the leading spout from the guide rails to the rotor.

This intermittently rotating rotor further transfers the spouts to a continuously rotating rotor of, for instance, an apparatus that manufactures bags attached with spouts.

In the above-described supply apparatus disclosed in Japanese Patent Application Laid-Open (Kokai) No. 11-208884, spouts are held by the spout holding means provided on the continuously rotating rotor when the spouts leave the guide rails. However, spouts are conveyed in the radial direction of the rotor and then held by the holding means on the rotor that are continuously moving in the circumferential direction. Accordingly, the supply apparatus have several problems.

One problem is that if an attempt is made to increase the spout transfer performance by way of increasing the rotational speed of the rotor, it becomes impossible to ensure a sufficient time for the transfer of the spouts from the guide rails to the holding means that are disposed on the continuously rotating rotor. Another problem is that in this supply apparatus, a guide is disposed along the direction of rotation of the rotor at the end portion of the guide rails in order to ensure a sufficient transfer time. However, since the holding of the spouts is accomplished during the rotation of the rotor, the transfer of the spouts becomes unstable if an attempt is made to increase the spout transfer performance by way of increasing the rotational speed of the rotor. Moreover, there is a possibility that the spouts are damaged as a result of rubbing against the guide, so that leaking of contents subsequently occurs when such a damaged spout is used for a bag even if the bag is sealed.

On the other hand, in the supply apparatus disclosed in the above-described Japanese Patent Application Laid-Open (Kokai) No. 2001-353793, transfer of spouts is performed while the rotor is stopped during its intermittent rotation. Accordingly, even if the rotational speed of the rotor is increased, the transfer can be done in a relatively stable fashion. However, if an attempt is made to increase the spout transfer performance by way of further increasing the rotational speed of the rotor, then stopping and positioning of the spouts at the tip end portions of the guide rails and holding of the spouts by the holding means become unstable.

SUMMARY OF THE INVENTION

The present invention was made in the light of the problems in the prior art apparatuses.

The object of the present invention is to provide a system in which a transfer of spouts from the guide rails to a rotor can be performed in a stable fashion even if the spout transfer performance is increased by way of speeding up the rotation of the rotor.

The above object is accomplished by a unique structure of the present invention for a spout supply apparatus in which spouts are supplied to spout holding members disposed at equal intervals around the circumference of a rotor that rotates intermittently by an amount equal to the attachment spacing intervals of the spout holding members, so that the spouts are supplied at a predetermined stopping position of the rotor. In this rotor, each spout holding member has a pair of holding sections which are disposed so as to face each other and which hold groove portions between the flanges of the spouts, and these holding sections are disposed with their opened portions facing outward in the radial direction of the rotor.

In the unique structure of the present invention, the above-described supply apparatus is provided with:

a pair of guide rails which engage with the groove portions of the spouts and are disposed so as to face the holding section of the spout holding member at the above-described predetermined position where the rotor stops its rotation, a conveying device that conveys the spouts along the guide rails in such a manner that a preceding spout is separated from following spouts by a predetermined distance, and a push-out device equipped that has a pushing pawl which pushes the leading spout, which is being conveyed along the guide rails, from the guide rails into the holding section of the spout holding member.

In this supply apparatus, the direction in which the spouts are pushed out by the pushing pawl is set to be the radial direction of the rotor; however, the conveying direction of the conveying device is not necessarily the radial direction of the rotor.

In the above structure of the present invention:

the spouts are transferred one at a time from the guide rails to the spout holding members when the intermittently rotating rotor is stopped;

since it is only necessary to push the spouts into the holding sections of the spout holding members disposed on the rotor without any operation that grasps the spouts on the rotor during the transfer of the spouts, the transfer of the spouts can be done in an extremely short period of time; and since the push-in direction of the pushing pawl and the orientation of the holding sections of the spout holding members are aligned, the pushing out of the spouts by the pushing pawl can be done at a high speed.

Accordingly, even if the rotor is intermittently rotated at a high speed, the spouts can be assuredly pushed into the holding sections of the spout holding members disposed on the rotor without causing any instability in the transfer of the spouts.

A fairly strong force is generally required in order to push the spouts into the holding sections of the spout holding members on the rotor (i.e., the spouts must be grasped by a fairly strong force in order to insure that the spouts does not shift in position or slip out of the holding sections of the spout holding members provided on the rotor that is rotating at a high speed). Such a push-in operation cannot be accomplished by the conveying device alone at a high speed, and the pushing pawl is required as it is provided in the present invention.

In the present invention, for instance, a timing screw whose forward lead is broadened is used as the above-described conveying device. With the use of such a timing screw, the spouts are conveyed with their head portions being engaged with the screw grooves of timing screw, and the spouts that are conveyed to the timing screw in a mutually concentrated state or in an irregular state can be conveyed forward by way of separating the spouts from each other by a predetermined distance as in the same manner as that described in the above-described Japanese Patent Application Laid-Open (Kokai) No. 11-208884.

With a timing screw, conveying of the spouts at its front end portion is unstable, and the timing screw does not have a sufficient force to push the spouts into the holding sections of the spout holding members disposed on the rotor. However, in the present invention, the spout that has been conveyed to the front end of the timing screw is contacted from behind by the pushing pawl and is pushed out in the forward direction, so that the spouts are pushed into the holding sections of the spout holding members on the rotor.

In the above-described supply apparatus, it is desirable that the pushing pawl be disposed in a position beneath the guide rails. The reason for this is that in cases where this pushing pawl is disposed above the guide rails, the pawl will contact the head portions of the spouts and damage the head portions. If this occurs, the contents would leak through the damaged spouts even if caps are put on the spouts.

Furthermore, the above-described push-out device is preferably designed so that:

the pushing pawl is formed on the tip end portion of a push-out member, the push-out member is pivotally connected at its rear end portion to one end of a swing lever which is at its other end swingably disposed, and the push-out member is rotatably connected at its intermediate portion to one end of a crank lever that is rotatable about a supporting shaft; and further the rotation of the crank lever causes the pushing pawl to make a rotational motion along the horizontal elliptical track whose longer axis is oriented in the radial direction of the rotor, and the elliptical track is set so that the pushing pawl avoids interfere with a leading spout (among the spouts being conveyed) when the pushing pawl is moved away from the rotor and so that the pushing pawl is brought into contact with the leading spout from behind when the pushing pawl is moved toward the rotor.

With the thus structured crank mechanism employed in the push-out device, the pushing pawl makes a smooth rotational motion at a high speed along the elliptical track and pushes out the spouts from the timing screw (or the conveying device). Thus, the supply apparatus can meet the high speed rotation of the rotor.

As described above in the prior art section, the spouts that have been supplied to the intermittently rotating rotor are then supplied to a continuously rotating rotor of, for instance, a manufacturing apparatus for bags that are attached with spouts or the like. As in the case of the intermittently rotating rotor, such a continuously rotating rotor of a bag manufacturing apparatus is provided with a plurality of spout holding members disposed at equal intervals around the circumference of the rotor, and the opened portions of the holding sections of the spout holding members face radially outward and the holding sections facing each other hold the groove portion formed between the flanges of each spout. In this case, it may be said that the intermittently rotating rotor is used as a transfer rotor that connects guide rails and the continuously rotating rotor and thus constitutes a part of an apparatus that supplies spouts to the above-described continuously rotating rotor in addition to the conveying device and push-out device.

In this case, the object of the intermittently rotating rotor (a transfer rotor) is to smooth the transfer of the spouts to the continuously rotating rotor; and this intermittently rotating rotor rotates intermittently by an amount equal to the attachment spacing intervals of the spout holding members in a fixed cycle of stopping, acceleration, constant speed, deceleration and stopping. In addition, the intermittently rotating rotor is set so that the speed of the spout holding members matches the speed of the spout holding members of the continuously rotating rotor during the constant-speed rotation. Thus, during the constant-speed rotation of the intermittently rotating rotor, the spouts are transferred from the spout holding members of this rotor to the spout holding members of the continuously rotating rotor.

The apparatus of the present invention described above is for spouts. However, the apparatus of the present invention is utilized also as a supply apparatus that supplies a spout-equipped bag in which a bag is sealed to a spout. In this case, the bags with spouts that are supplied to the intermittently rotating rotor are subsequently supplied to the continuously rotating rotor of, for instance, a filling machine.

DETAILED DESCRIPTION OF THE INVENTION

The supply apparatus of the present invention will be described in detail below with reference to FIGS. 1 through 6.

The apparatus shown in FIGS. 1 through 4 is for supplying bags that are attached with spouts, and this apparatus supplies bags W with spouts to an intermittently rotating rotor 1. The following description will be made with reference to the spout(s) S that are attached to the bags W.

Figure 2:
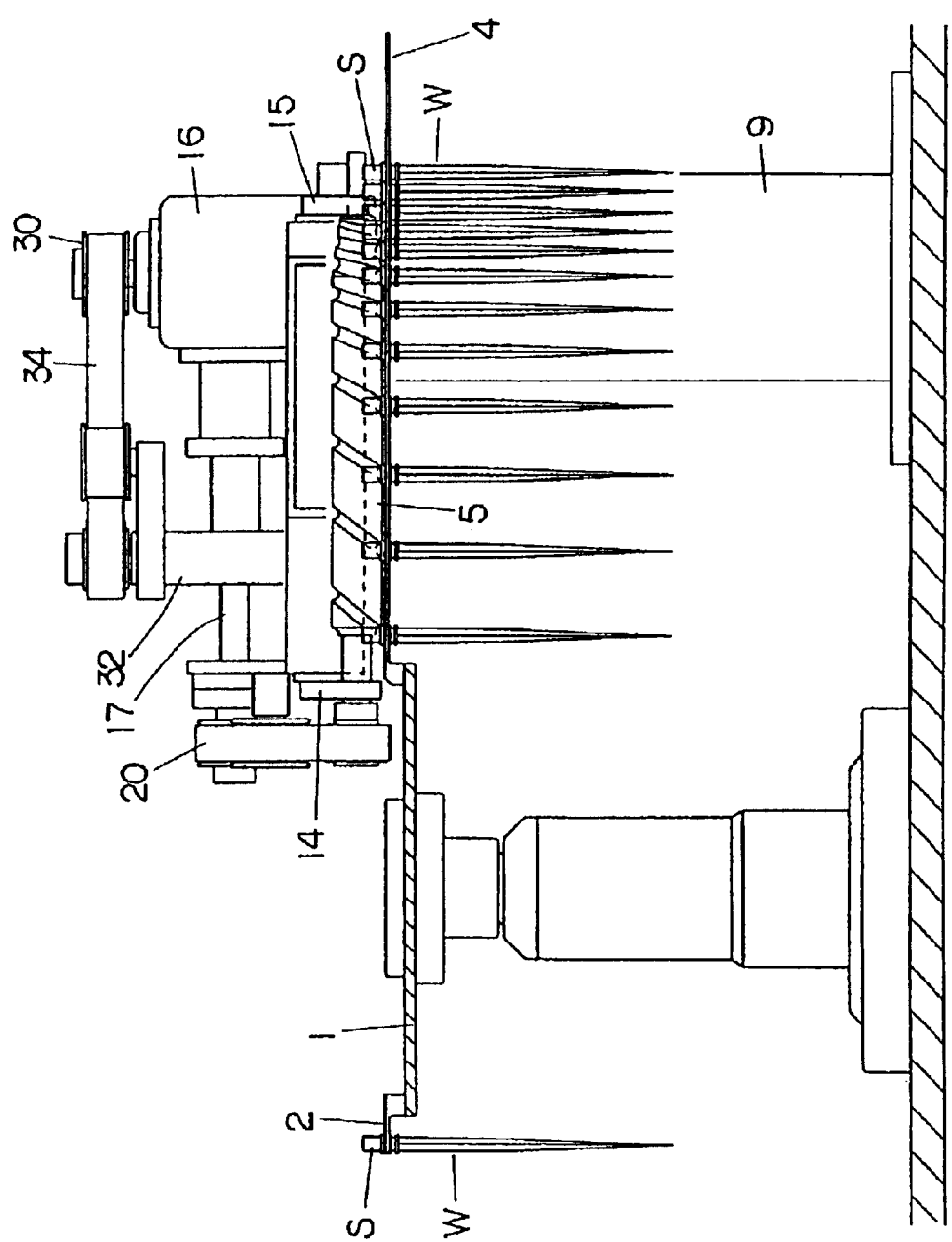
FIG. 2 is a partially sectional front view thereof.
Figure 3:
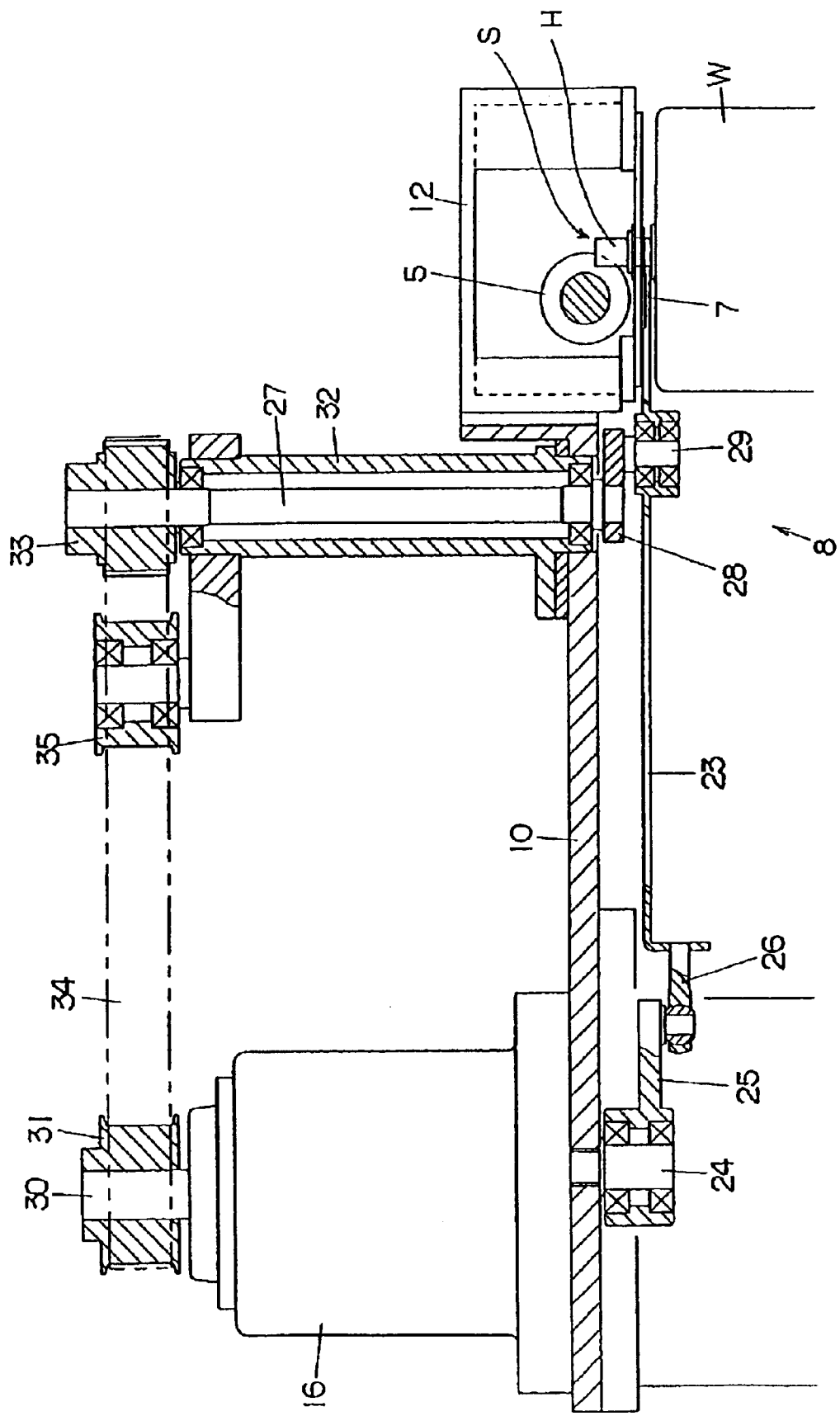
FIG. 3 is a partially sectional left-side view showing the drive mechanism.
Figure 4:
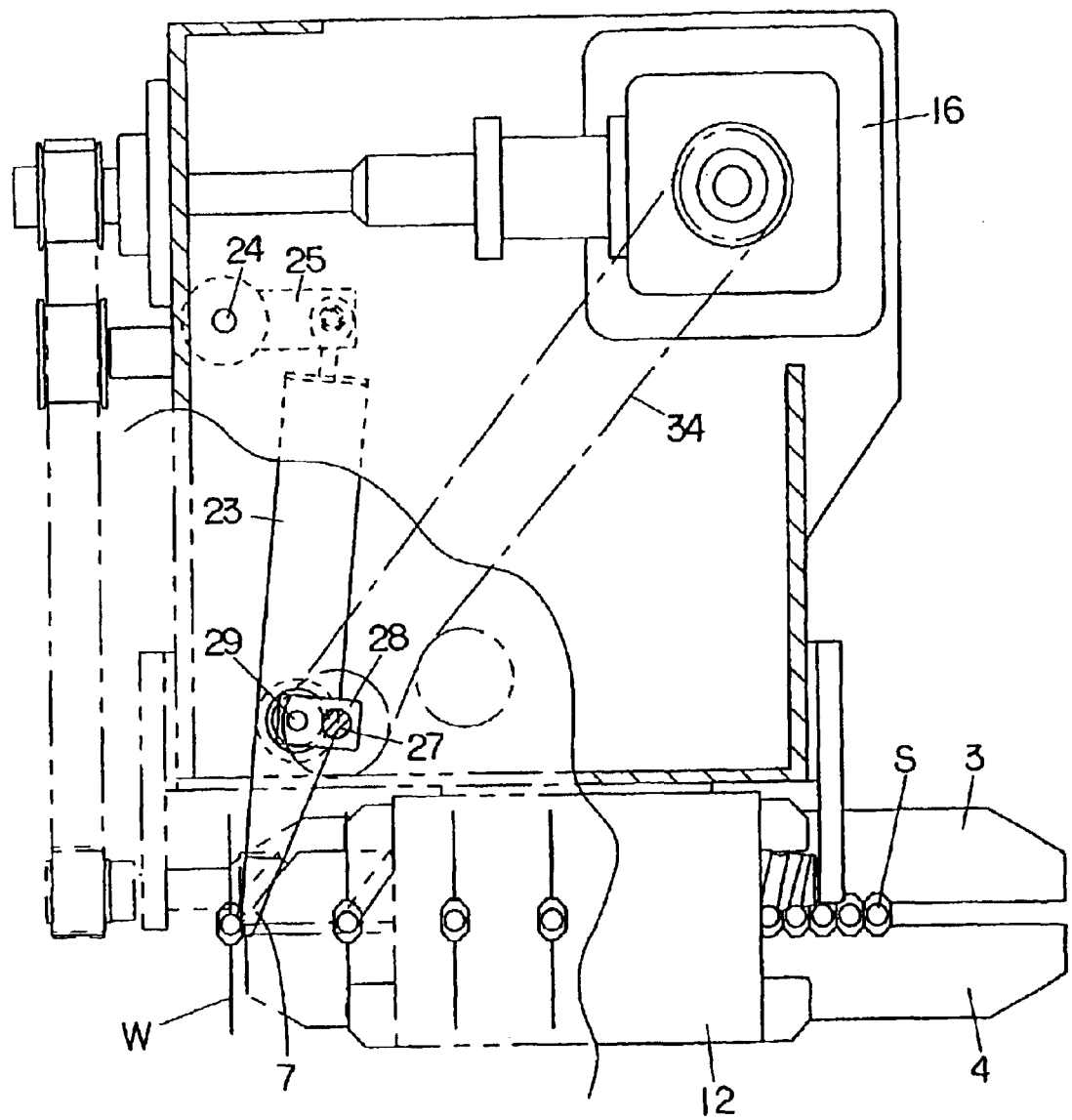
FIG. 4 is a partially sectional top view thereof.

A plurality of spout holding members 2 which have a pair of holding sections 2a (see FIG. 5) that hold groove portions formed between the flanges of the spouts S (see FIG. 2 of the above-described Japanese Patent Application Laid-Open (Kokai) No. 2001-353793) are disposed at equal intervals around the circumference of the rotor 1 so that the opened portions 2b of the holding sections 2a face radially outward of the rotor 1. The rotor 1 rotates intermittently by an amount that is equal to the attachment spacing intervals of the spout holding members 2 each time, and this intermittent rotation is made in a fixed cycle of stopping, acceleration, constant speed, deceleration and stopping (described later).

The supply apparatus includes a pair of guide rails 3 and 4, a conveying device 6 and a push-out device 8. The guide rails 3 and 4 are disposed facing each other so that these guide rails engage with the groove portions formed between the flanges of the spouts S. The conveying device 6 includes a timing screw 5 disposed on the guide rails 3 and 4. The push-out device 8 includes a pushing pawl 7 disposed in a position beneath the guide rails 3 and 4. The supply apparatus is disposed in a frame 10 provided on a stand 9.

The guide rails 3 and 4 are fastened to the lower portion of a guide rail attachment frame 12 which is fixed to the frame 10. The guide rails 3 and 4 are disposed horizontally and oriented in the radial direction of the rotor 1, and in addition, they are disposed so that they face one of the stopping positions of the spout holding members 2.

More specifically, the guide rails 3 and 4 are provided so that a gap 13 between the engaging portions 3a and 4a of the guide rails 3 and 4 faces the opened portion 2b of holding sections 2a of the spout holding members 2 at the time when the rotator 1 stops its rotation. Furthermore, the tip ends of the guide rails 3 and 4 are located at a position that is extremely close to the tip end of each spout holding member 2, and these tip ends of the guide rails 3 and 4 are disposed at the same height as the spout holding members 2.

Accordingly, while the rotor 1 is stopped, the engaging portions 3a and 4a of the guide rails 3 and 4 and the holding section 2a of each one of the spout holding members 2 are in a more or less in a continuous state (the gap 13 between the engaging portions 3a and 4a is set so as to be slightly wider than the gap 2c between the holding sections 2a of the spout holding member 2), and the spout S that has been advanced further from the guide rails 3 and 4 passes "as is" through the opened portion 2b, enters the gap 2c, and is held by the holding section 2a of each spout holding member 2. The engaging portions 3a and 4a of the guide rails 3 and 4 and the holding sections 2a of the spout holding members 2 engage with the same groove of the spout S.

In the conveying device 6, the shafts at both ends of the timing screw 5 are supported on supporting members 14 and 15 fastened to the frame 10 so that the timing screw 5 is rotated. The timing screw 5 is disposed in a position above the guide rails 3 and 4 so that the side surfaces of the timing screw 5 are positioned in the gap 13 between the guide rails 3 and 4.

Moreover, as the drive mechanism of the timing screw 5, the conveying device 6 includes a speed reduction gear 16 which is connected to a driving source (motor, not shown), the output shaft 17 of this speed reduction gear 16, a timing pulley 18 which is fastened to the tip of the output shaft 17, a timing pulley 19 which is fastened to the shaft portion at the forward end of the timing screw 5, and a timing belt 20 and tension pulley 21 that are installed between the timing pulleys 18 and 19. The timing screw 5 is caused to rotate at a constant speed by this drive mechanism.

The spouts S of the bags W that are advanced in a dense state along the rails 3 and 4 (see FIG. 2) respectively engage at their head portions H with the groove 5a formed in the surface of the timing screw 5, and the bags W are conveyed in the forward direction (toward the left side in FIG. 2) along the rails 3 and 4. The lead of the timing screw 5 is broadened in the forward direction, so that the speed of advance of the spouts S of the bags W increases, and the spouts S are advanced while being separated from each other by a predetermined distance.

The pushing pawl 7 of the push-out device 8 is integrally formed on the tip end of a push-out member 23 that is horizontally disposed beneath the frame 10. The pushing pawl 7 is horizontally disposed beneath the guide rails 3 and 4 so that it is at the height of the groove on the lower side of each spout S (see FIG. 3).

One end of a swing lever 25 is supported on the supporting shaft 24, which is fastened to the frame 10 in a vertical attitude, so that the swing lever 25 is free to swing horizontally.

The rear end portion of the push-out member 23, which is disposed more or less along the tangential direction of the rotor 1, is connected to the other end of the swing lever 25 via a connecting member 26 so that the push-out member 23 pivots horizontally. The intermediate portion of the push-out member 23 located closer to the tip end portion is connected (so that the push-out member 23 is rotatable) via a connecting shaft 29 to one end of a crank lever 28 that is fastened to a supporting shaft 27 so that the crank lever 28 rotates together with this supporting shaft 27.

Moreover, as the drive mechanism of the push-out member 23 (the pushing pawl 7), the push-out device 8 includes: a speed reduction gear 16 that is shared with the conveying device 6, an output shaft 30 of the speed reduction gear 16, a timing pulley 31 which is fastened to the tip end of the output shaft 30, the supporting shaft 27 which is rotatably supported inside a supporting stand 32 that is fastened to the frame 10, a timing pulley 33 which is fastened to the upper end of the supporting shaft 27, and a timing belt 34 and a tension pulley 35 which are installed between the timing pulleys 31 and 33. The supporting shaft 27 is rotated at a constant speed by this drive mechanism.

Figure 5:
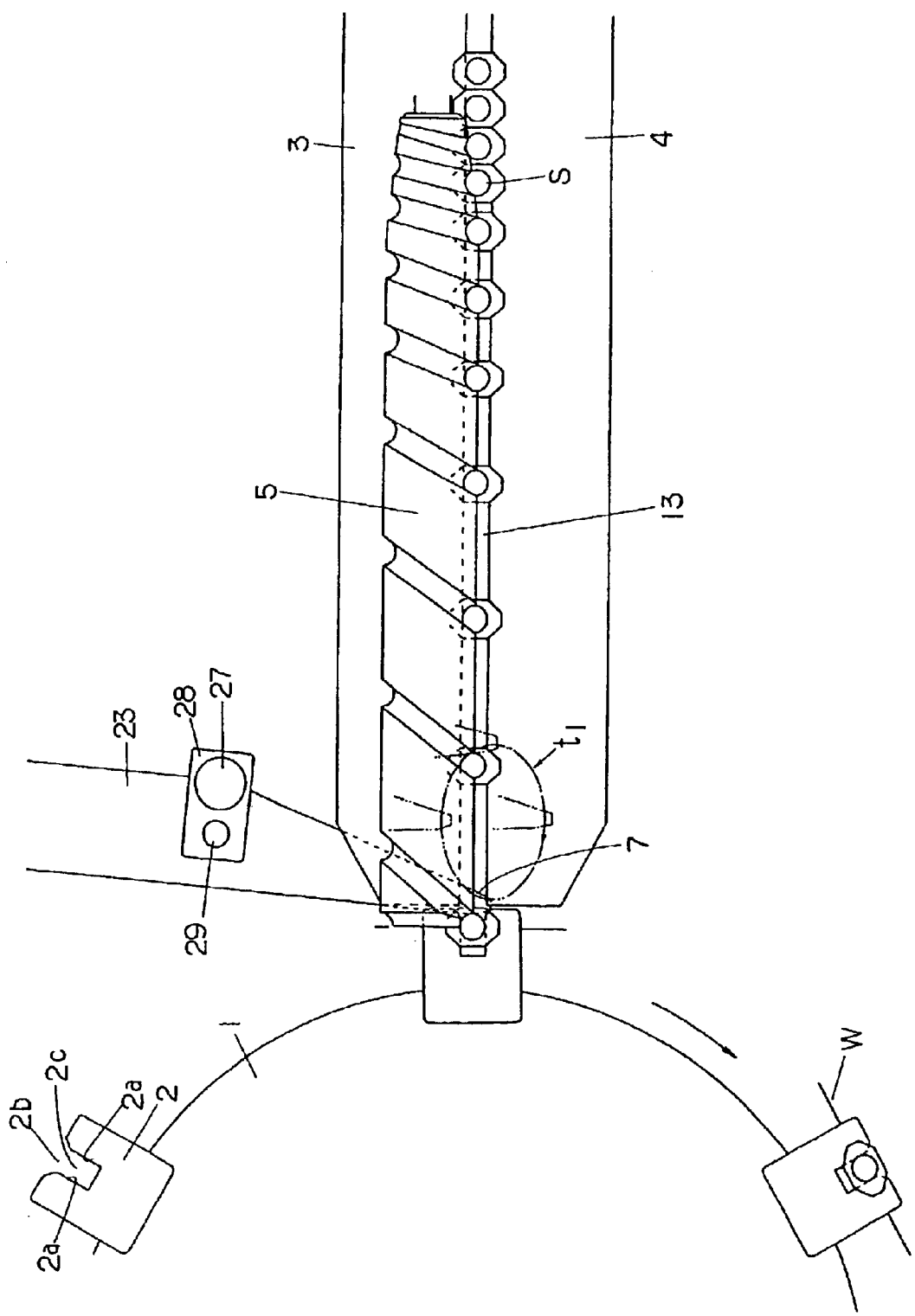
FIG. 5 is a schematic top view illustrating the transfer of the spouts from the guide rails to the holding sections of the spout holding members disposed on the rotor.

In the push-out device 8 thus structured, the supporting shaft 27, the crank lever 28 and the connecting shaft 29 constitute a crank mechanism. When the supporting shaft 27 is rotated, the connecting shaft 29 rotates about the supporting shaft 27, so that the push-out member 23 makes a movement in which the rotational motion that accompanies the rotation of the connecting shaft 29 and the swinging motion resulting from the connection of the rear end to the swing lever 25 are synthesized. As a result of this movement of the push-out member 23, the push-end lever 7 on the tip end portion undergoes a rotational motion in the horizontal plane along a substantially elliptical track $t_1$ whose longer axis is oriented in the radial direction of the rotor 1 as shown in FIG. 5.

As seen from this elliptical track $t_1$, the pushing pawl 7 is retracted from the position of the engaging portions 3a and 4a of the guide rails 3 and 4 when the pushing pawl 7 is moved away from the rotor 1; and the pushing pawl 7 surpasses (or is advanced over) the engaging portions 3a and 4a when the pushing pawl 7 is moved toward the rotor 1. Accordingly, the pushing pawl 7 is retracted without interfering with the leading spout that is conveyed along the guide rails 3 and 4 and then is rotated inward so as to be behind the leading spout.

The timing of the rotation of the timing screw 5 is set with respect to the rotation of the rotor 1 so that when the rotor 1 stops its rotation and the opened portion 2c of one of the spout holding members 2 is stopped so as to face the front ends of the guide rails 3 and 4, the leading spout reaches the vicinity of the front ends of the guide rails 3 and 4 (with the groove portion of the leading spout as a whole is between the rails 3 and 4).

Furthermore, the timing of the rotation of the pushing pawl 7 is set with respect to the timing screw 5 so that:

the pushing pawl 7 makes one rotation during one rotation of the timing screw 5, when the pushing pawl 7 is moved away from the rotor 1, the pushing pawl 7 rotates inward so as to be behind the leading spout among the spouts that are conveyed along the guide rails 3 and 4 by the timing screw 5, when the pushing pawl 7 is moved toward the rotor 1, the pushing pawl 7 overtakes the spout that has reached the vicinity of the front ends of the guide rails 3 and 4 and comes into contact with this spout from behind.

The pushing pawl 7 that has thus come into contact with the leading spout then pushes this spout out in the forward direction, so that the spout leaves the guide rails 3 and 4 and is pushed into the holding sections 2a of the spout holding members 2 provided on the rotor 1 as shown in FIG. 5.

Afterward, the rotor 1 begins its intermittent rotation.

Figure 1:
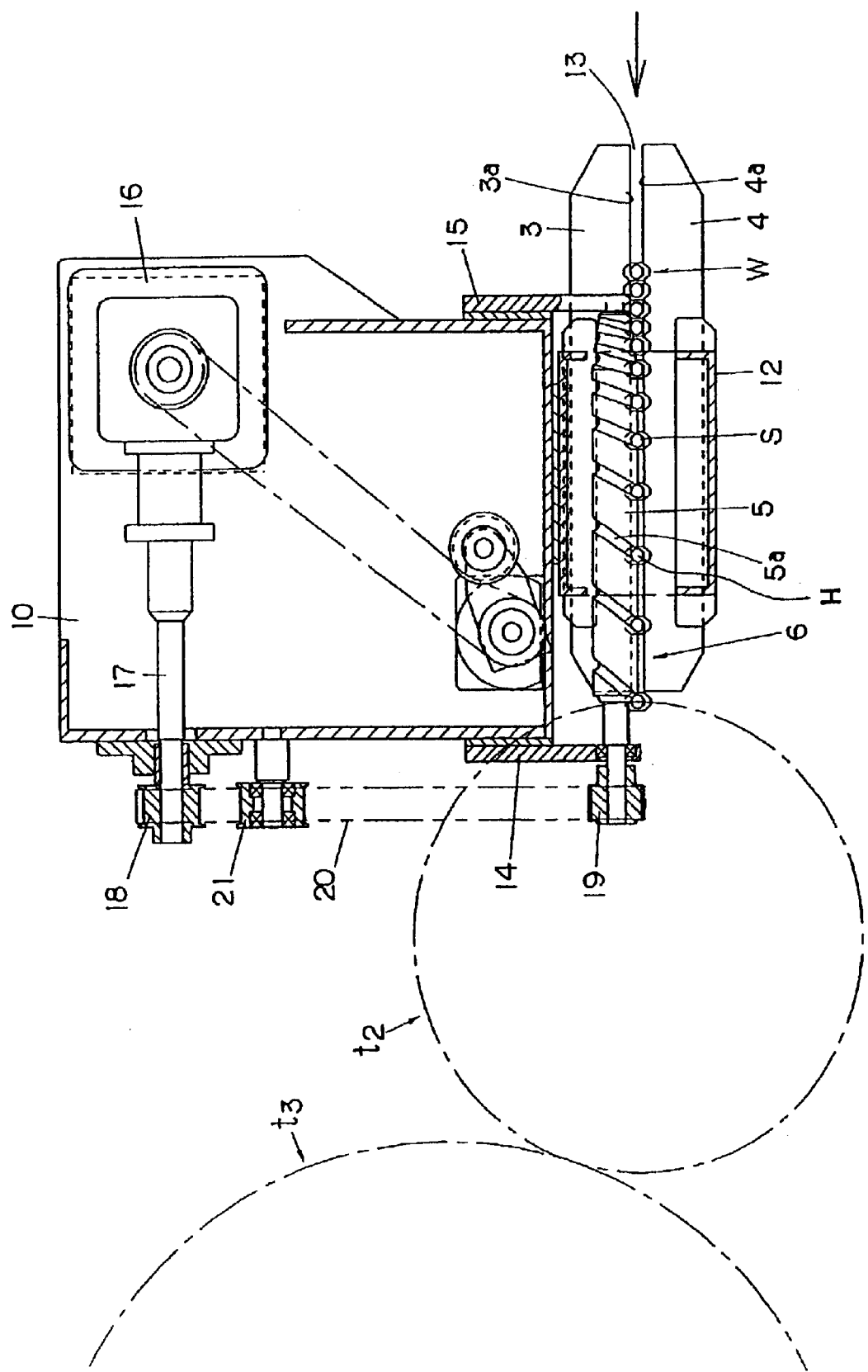
FIG. 1 is a partially sectional top view of the supply apparatus according to the present invention.
Figure 6:
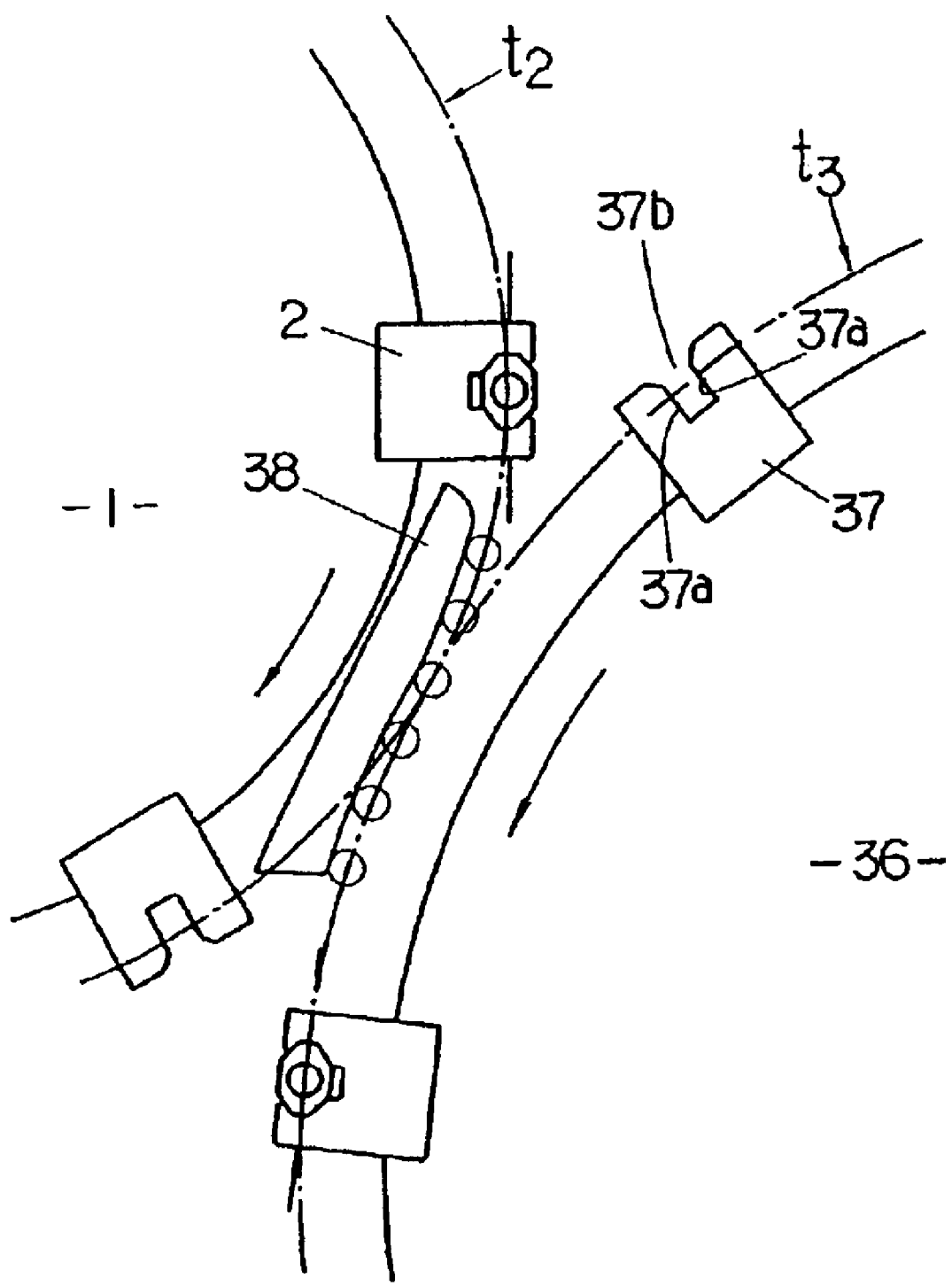
FIG. 6 is a schematic top view illustrating the transfer of the spouts from the intermittently rotating rotor to a continuously rotating rotor.

As shown in FIGS. 1 and 6, a continuously rotating rotor 36 of, for instance, a filling device is disposed in the vicinity of the intermittently rotating rotor 1, and the spouts S (or bags W with the spouts S attached) received by the rotor 1 are transferred to the continuously rotating rotor 36.

As in the case of the rotor 1, as seen from FIG. 6, a plurality of spout holding members 37, each of which has a pair of holding sections 37a that hold the groove portions between the flanges of the spouts S, are disposed at equal intervals around the circumference of the continuously rotating rotor 36 so that the opened portions 37b of the holding sections 37a of the spout holding members 37 face radially outward. However, the position of the holding sections 37a in the direction of height is set at a lower position than that of the holding sections 2a, so that the lower groove portion of each one of the spouts S is held by the holding sections 37a of the spout holding members 37 (the holding sections 2a of the spout holding members 2 hold the upper groove portion).

The transfer of the spouts S (or bags W) from the intermittently rotating rotor 1 to the continuously rotating rotor 36 is accomplished using more or less the same configuration as that described in the above-described Japanese Patent Application Laid-Open (Kokai) No. 2001-353793. This may be briefly described as follows:

The rotor 1 and the continuously rotating rotor 36 are disposed so that the conveying track $t_2$ of the centers of the spout holding positions of the spout holding member 2 of the rotor 1 and the conveying track $t_3$ of the centers of the spout holding positions of the spout holding members 37 of the continuously rotating rotor 36 come into contact. Since the holding sections of the respective spout holding members 2 and 37 are positioned at different heights, these holding sections do not interfere with each other.

Setting is made so that the rotor 1 rotates at a constant speed through a specified range preceding and following the position where the two conveying tracks come into contact with each other, and the spout holding members 2 and the spout holding members 37 are rotated at the same speed with both sets of spout holding members being lined up facing each other. During this constant-speed rotation, the spouts S (or bags W having the spouts S) that are held by the holding sections 2a of the spout holding members 2 are transferred to the holding sections 37a of the spout holding members 37.

In the vicinity of the position where the two tracks come into contact with each other, a guide member 38 (see the above-described Japanese Patent Application Laid-Open (Kokai) No. 2001-353793) which contacts each spout S that has been conveyed to this point and guides this spout S from the conveying track $t_2$ to the conveying track $t_3$ is disposed in a position beneath the rotor 1 (at a height corresponding to the bottom of the flange of the spout S). In the vicinity of the position where the two tracks come into contact with each other, the spouts S are introduced into the opened portion 37b of the holding sections 37a of the spout holding members 37 and then contact the guide surface of this guide member 38. As the spout holding members 2 and 37 are rotated, the spouts S are guided by this guide surface so that the spouts S are pushed into the center of the spout holding position of the holding sections 37a. Then, the spouts S are further guided by the guide surface so that the spouts S slip out from the holding sections 2a. As a result, the transfer of the spouts S (or bags W with the spouts S attached) is completed. FIG. 6 sequentially shows the transfer of the spouts S.

Figure 7:
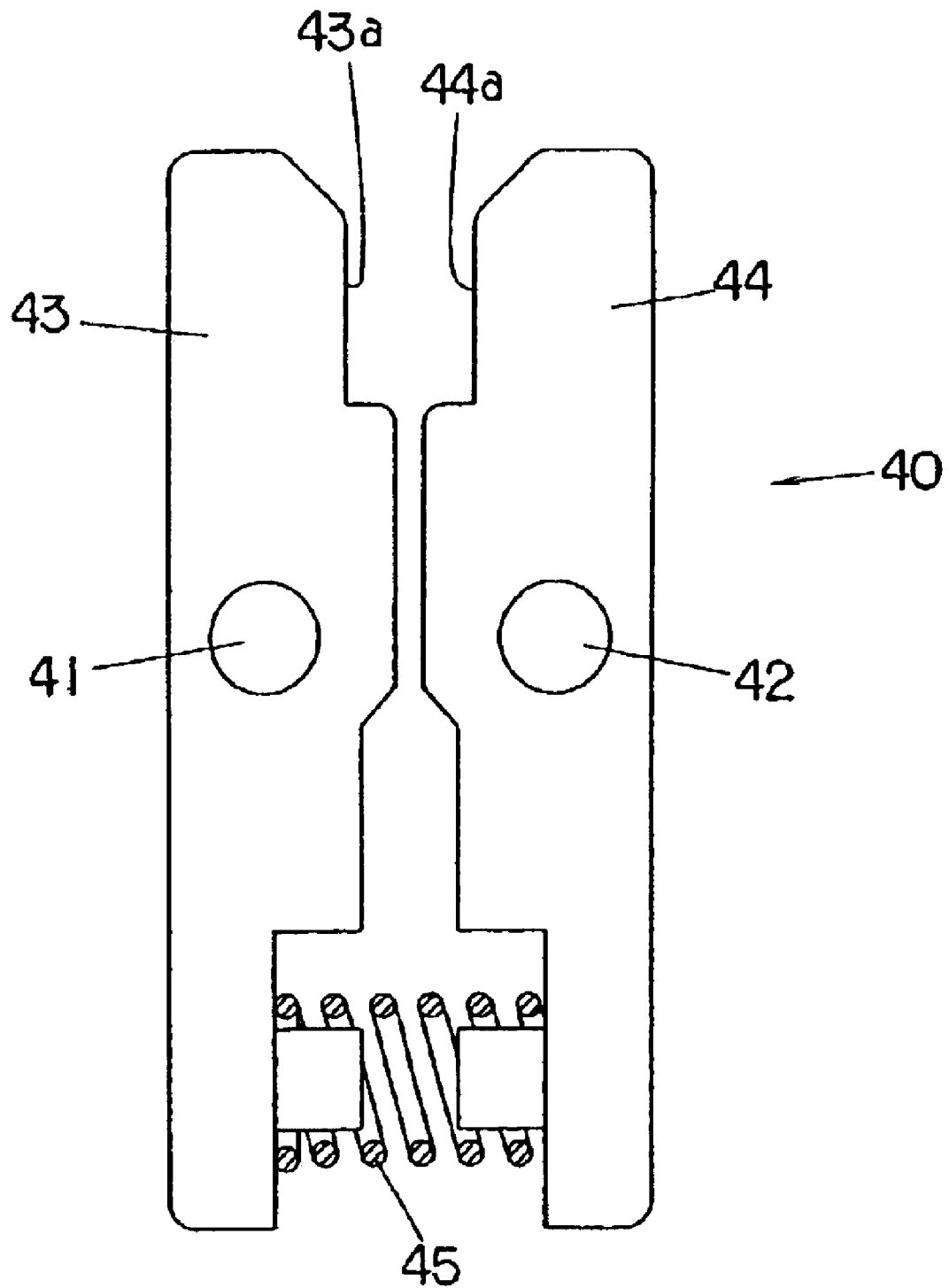
FIG. 7 is a top view showing an opening-and-closing type spout holding member.

FIG. 7 shows an opening-and-closing type spout holding member 40 which differs from the fixed type spout holding members 2 and 37 (in which the holding sections are fixed and not movable) described above.

This spout holding member 40 is comprised of holding elements 43 and 44, which are respectively rotatable about opening-and-closing supporting shafts 41 and 42, and a compression spring 45, which connects the rear portions of the holding elements 43 and 44. Holding sections 43a and 44a that correspond to the holding sections 2a and 37a of the spout holding members 2 and 37 described above are formed on these holding elements 43 and 44 Ordinarily, the gap between the holding sections 43a and 44a is maintained as a somewhat narrowed gap by the driving force of the compression spring 45. When a spout S arrives at the holding sections 43a and 44a, the gap is widened against the driving force of the compression spring 45, so that the spout S is held between the holding sections 43a and 44a.

The spout holding member 40 is the same as the spout holding members 2 and 37 in terms of holding the groove portions of the spouts S by means of a pair of holding sections that are disposed so as to face each other.

The above description is made mainly with reference to spouts to be attached to bags; but from the description above, it is evident that the supply apparatus of the present invention is applicable to an apparatus that supplies a spout-equipped bag (or a bag with a spout) in which a bag is sealed to a spout.

As seen from the above, according to the present invention, the transfer of spouts or bags attached with spouts from guide rails to a rotor can be stably performed even if the spout transfer performance is increased by speeding up the rotation the rotor (which is an intermittent rotating type). Furthermore, spouts or bags with spouts can be transferred at a high speed via this intermittent rotating rotor to a continuously rotating rotor, so that the overall processing capacity (number of spouts or bags transferred per minute) of a filing machine or an apparatus for manufacturing bags with spouts attached can be greatly increased.

What is claimed is:

1. A supply apparatus for supplying spouts to spout holding members provided at equal intervals on a circumference of a rotor when said rotor, which rotates intermittently by an amount equal to said intervals of said spout holding members, stops a rotation thereof at a predetermined position, each of said spout holding members being comprised of a holding section that opens outward with respect to a radial direction of said rotor and holds a spout at a groove portion of said spout that is formed between flanges of said spout, said supply apparatus comprising:

a pair of guide rails which engage with said groove portion of said spout, said guide rails being disposed so that end portions thereof face said holding section of said spout holding member at said predetermined position where said rotor stops said rotation thereof, a conveying device that conveys said spouts along said guide rails in such a manner that a preceding spout is separated from following spouts by a predetermined distance, and a push-out device equipped with a pushing pawl that pushes a leading spout, which is being conveyed along said guide rails, from said guide rails into said holding section.

2. The supply apparatus for spouts according to claim 1, wherein said conveying device is a timing screw with a forward lead thereof broadened, and said spouts are conveyed with head portions thereof being engaging with grooves of said timing screw.

3. The supply apparatus for spouts according to claim 1 or 2, wherein said pushing pawl is disposed so as to be beneath said guide rails.

4. The supply apparatus for spouts according to claim 1 or 2, wherein:

said pushing pawl is formed on a tip end portion of a push-out member, said push-out member is pivotally connected at a rear end portion thereof to one end of a swing lever which is at another end thereof swingably disposed, and said push-out member is rotatably connected at an intermediate portion thereof to one end of a crank lever that is rotatable about a supporting shaft; and wherein a rotation of said crank lever causes said pushing pawl to make a rotational motion along a horizontal elliptical track whose longer axis is oriented in a radial direction of said rotor, and said elliptical track is set so that said pushing pawl avoids interfering with said leading spout when said pushing pawl is moved away from said rotor and so that said pushing pawl is brought into contact with said leading spout from rear of said leading spout when said pushing pawl is moved toward said rotor.

5. The supply apparatus for spouts according to claim 3, wherein:

said pushing pawl is formed on a tip end portion of a push-out member, said push-out member is pivotally connected at a rear end portion thereof to one end of a swing lever which is at another end thereof swingably disposed, and said push-out member is rotatably connected at an intermediate portion thereof to one end of a crank lever that is rotatable about a supporting shaft; and wherein a rotation of said crank lever causes said pushing pawl to make a rotational motion along a horizontal elliptical track whose longer axis is oriented in a radial direction of said rotor, and said elliptical track is set so that said pushing pawl avoids interfering with said leading spout when said pushing pawl is moved away from said rotor and so that said pushing pawl is brought into contact with said leading spout from rear of said leading spout when said pushing pawl is moved toward said rotor.

6. A supply apparatus for supplying bags provided with spouts, wherein said supply apparatus according to claim 1 or 2 is an apparatus that supplies bags to which spouts are sealed.

7. A supply apparatus for supplying bags provided with spouts, wherein said supply apparatus according to claim 3 is an apparatus that supplies bags to which spouts are sealed.

8. A supply apparatus for supplying bags provided with spouts, wherein said supply apparatus according to claim 4 is an apparatus that supplies bags to which spouts are sealed.

9. A supply apparatus for supplying bags provided with spouts, wherein said supply apparatus according to claim 5 is an apparatus that supplies bags to which spouts are sealed.

* * * * *